W. DEATS.
MAGNETIC FISH AND PROCESS OF MAKING THE SAME.
APPLICATION FILED FEB. 1, 1918.

1,271,021.

Patented July 2, 1918.

INVENTOR
William Deats
BY
ATTORNEY

UNITED STATES PATENT OFFICE.

WILLIAM DEATS, OF YONKERS, NEW YORK, ASSIGNOR TO McLOUGHLIN BROS., INC., OF NEW YORK, N. Y., A CORPORATION OF NEW YORK.

MAGNETIC FISH AND PROCESS OF MAKING THE SAME.

1,271,021.  Specification of Letters Patent.  Patented July 2, 1918.

Application filed February 1, 1918.  Serial No. 214,832.

*To all whom it may concern:*

Be it known that I, WILLIAM DEATS, of city of Yonkers, in the county of Westchester, and in the State of New York, have invented a certain new and useful Improvement in Magnetic Fish and Processes of Making the Same, and do hereby declare that the following is a full, clear, and exact description thereof.

The object of my invention has been to provide an improved form of magnetic fish, or similar objects, to be used as a game where imitation fish are drawn out of a dish or imitation pond by means of a magnetic fishing tackle, such as a magnetic fishhook on the end of a toy fishing line or pole, and to such ends my invention consists in the magnetic fish or similar objects, and process of making the same hereinafter specified.

In the accompanying drawing—

Figure 1:
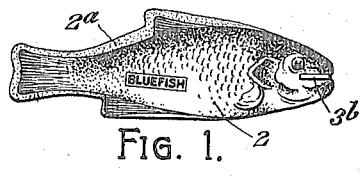
Figures 1, 2 and 3 are, respectively, right and left views and a front edge view of a fish embodying my invention.
Figure 5:
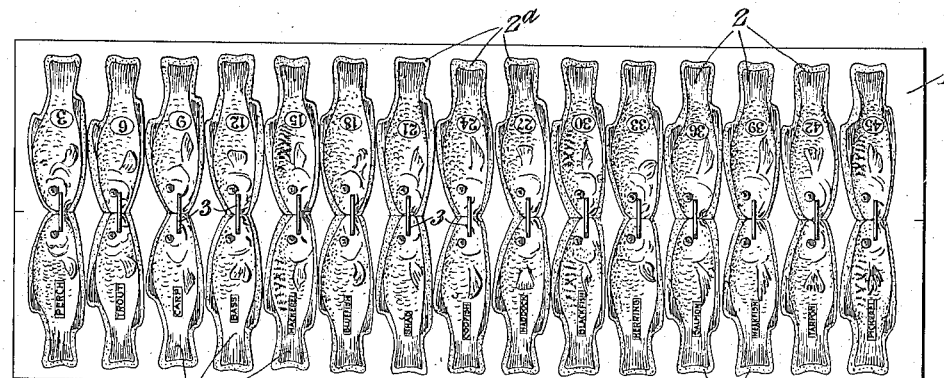

Fig. 5 a back view of a card or sheet having fish such as shown in Fig. 1 formed thereon in pairs preparatory to cutting them out and separating them.

Figure 6:
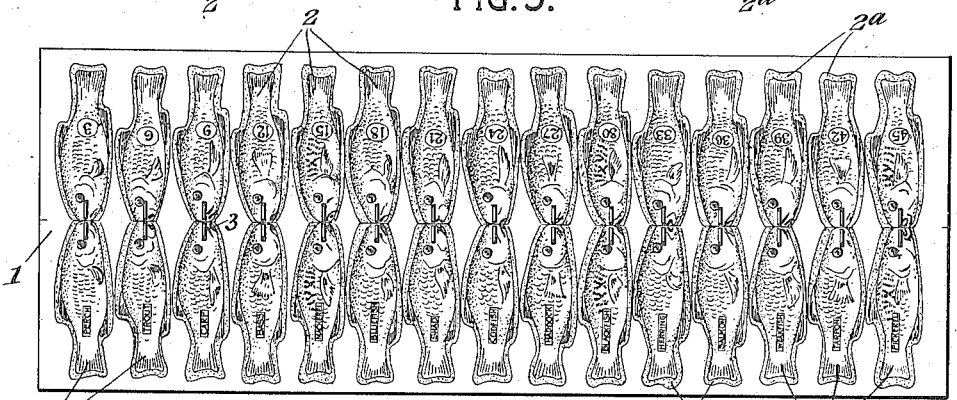

Fig. 6 a front view of a card or sheet having fish such as shown in Fig. 1 formed therein in pairs preparatory to cutting them out and separating them.

Figures 7, 8:
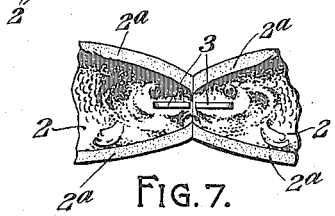

Fig. 7 an enlarged back view of a pair of fish cut out but not separated; and

Fig. 8 a front view of a pair of fish cut out but not separated.

To state the object of my invention more fully, there is a well-known game in which imitation fish are placed in a dish, the fish being made of paper or other non-magnetic material, and each fish being provided with a piece of magnetic material at or near its mouth, so that the fish may be "caught" by engaging the said piece of magnetic material with a magnetic hook suspended by a fish line from a toy fishing rod. By my invention the fish are provided with a piece of magnetic material that is formed and located in a more satisfactory way than has heretofore been the case, and which is applied to the fish by a process that is efficient and of low cost.

My invention is capable of application to other objects than fish, and my process of practice in various forms, and the illustrated fish and process are therefore to be taken only as typical of many possible embodiments of my invention, and my invention is not to be confined thereto.

Referring now to the accompanying drawing: I shall first explain the process of making the fish because an understanding of the process will make the construction of the fish itself understood.

Figure 2:
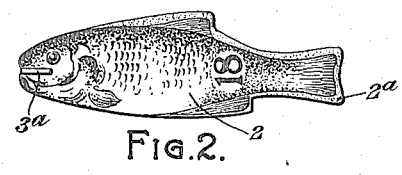
Figure 3:
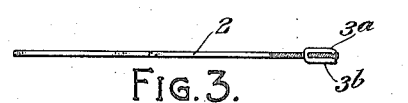
Figure 4:
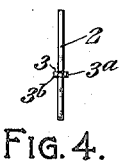
Fig. 4 is a front view.

In the practice of the said process in the illustrated embodiment, I provide a card 1, having fish 2 printed thereon in pairs, and preferably having a colored margin 2ª around the fish larger than the fish, the noses of the fish preferably touching, or nearly touching, and the said outlines merging into each other. The back of the card, as shown in Fig. 5, is printed in the same manner, so that when fish are cut out of the card, as shown in Figs. 1 and 2, the sides of the cut-out will have the appearance of the corresponding sides of the fish. I then, with any convenient machine, drive U-shape metal staples 3 through each pair of fish, the legs of these staples passing through the fish preferably in the neighborhood of, but below, the eye, and the legs of the staples being turned over on the back of the card, as shown in Fig. 5. In this position, the staples give the appearance of forming the line of the mouth. The staples are preferably compressed hard against the card on both sides. The staples are formed of magnetic material. The fish are then cut apart from each other in any desired way, and the fish of each pair separated. For instance, the pairs of fish may be formed with their noses in a straight line, as shown, and the card may be cut along that line, thus cutting the pairs of fish apart and cutting the staples in two at the same time, leaving one-half of each staple in each fish, as shown in Figs. 1, 2 and 3. The colored margin 2ª about the fish allows for a certain amount of inaccuracy in cutting out the fish without having any of the white of the card show. Either the staples or the fish-hook can be magnetized.

The form of the piece of magnetic material in the fish, constituted by one-half of the staple, has decided advantages.

1. This piece of magnetic material is securely fastened in the fish.

2. The ends 3ª and 3ᵇ of the wire can be located at the very mouth of the fish, so that the magnetic hook used in catching the fish can apparently hold the fish by its mouth in a most realistic manner.

3. The process of forming this fish is very convenient and inexpensive. The staples are easily formed and inserted. The one operation of inserting a single staple provides each of two fish with their magnetic material. The severing of all the staples on a single card can be performed at a single operation and this operation tends to bend the freshly cut end 3ª of the staple slightly around the fish's nose, and thus to more securely fasten it, and to prevent the staple from turning around on the fish.

I claim:

1. An imitation fish or similar object, comprising a non-magnetic body, and a piece of magnetic wire passing through the fish and having its ends extended to or near the mouth of the fish.

2. An imitation fish or similar object, comprising a non-magnetic body and having a magnetic staple secured in its head.

3. An imitation fish or similar object, comprising a non-magnetic body and having a magnetic staple embracing the head of the fish near its mouth.

4. An imitation fish or similar object, comprising a non-magnetic body, and having a U-shape piece of magnetic metal passing through an opening in the head, and having the legs extended near the mouth.

5. An imitation fish or similar object, comprising a non-magnetic body, having a U-shape piece of magnetic metal passing through an opening in the head, and having the legs extended near the mouth, at least one end of one of said legs being bent toward the other leg.

6. An imitation fish or similar object, comprising a non-magnetic body, having a U-shape piece of magnetic metal passing through an opening in the head, and having the legs extended near the mouth, said legs being compressed against said head.

7. A fish comprising a flat paper body having the outline of a fish, having the appearance of a fish on its opposite sides, and having a U-shape piece of magnetic wire passing through the head of the fish with its legs extending along the surface of the card in the neighborhood of the mouth of the fish.

8. A fish comprising a flat paper body having the outline of a fish, having the appearance of a fish on its opposite sides, and having a U-shape piece of magnetic wire passing through the head of the fish with its legs extending along the surface of the card in the neighborhood of the mouth of the fish, said legs being compressed against the card.

9. The process of making artificial fish, comprising printing fish in pairs on a card, the noses of each pair of fish being adjacent to each other, driving a staple through the heads of said fish, and bending the legs of said staple toward each other, and severing the fish and staples from each other.

10. The process of making artificial fish, consisting in placing two fish so that their noses shall be adjacent to each other, driving a staple through the heads of said fish, bending its legs toward each other, and severing said staple.

11. The process of making artificial fish, consisting in printing a pair of fish on a card with their noses toward each other and their colors practically touching, driving a staple through the heads of both fish, turning its legs toward each other, and cutting said card and staple between the two fish.

12. The process of making artificial fish, comprising printing pairs of fish on a card, the noses of each pair being toward each other, and the noses of a number of pairs being in line with each other, driving a single staple through the heads of each of said pairs of fish, turning the legs of such staples toward each other, and then severing said fish and staples.

13. The process of making artificial fish, comprising printing pairs of fish on a card, the noses of each pair being toward each other, and the noses of a number of pairs being in line with each other, driving a single staple through the heads of each of said pairs of fish, turning the legs of such staples toward each other, and then severing said fish and staples by a single cutting operation.

In testimony that I claim the foregoing I have hereunto set my hand.

WILLIAM DEATS.

Witnesses:
Le Roy Howard,
Arthur Le Long.